(12) United States Patent
Walther

(10) Patent No.: US 8,348,575 B2
(45) Date of Patent: Jan. 8, 2013

(54) SELF-COUNTER-SINKING SCREW WITH CIRCUMFERENTIAL CUTTERS

(75) Inventor: Mirco Walther, Thunder Bay (CA)

(73) Assignee: Illinois Tool Works Inc., Glenview, IL (US)

( * ) Notice: Subject to any disclaimer, the term of this patent is extended or adjusted under 35 U.S.C. 154(b) by 894 days.

(21) Appl. No.: 12/342,828

(22) Filed: Dec. 23, 2008

(65) Prior Publication Data

US 2010/0158634 A1 Jun. 24, 2010

(30) Foreign Application Priority Data

Dec. 19, 2008 (CA) .................................. 2647633

(51) Int. Cl.
*F16B 35/06* (2006.01)
(52) U.S. Cl. .................. 411/399; 411/402; 411/957
(58) Field of Classification Search .............. 411/132, 411/168, 399, 402–403, 408, 411, 424, 957; 470/8, 12
See application file for complete search history.

(56) References Cited

U.S. PATENT DOCUMENTS

| | | | | |
|---|---|---|---|---|
| 298,427 A * | 5/1884 | Stone | ............................ | 411/399 |
| 466,463 A * | 1/1892 | Holland | ........................ | 411/399 |
| 3,903,784 A * | 9/1975 | Dekker | .......................... | 411/399 |
| 3,926,237 A * | 12/1975 | Enders | .......................... | 411/135 |
| 4,808,050 A * | 2/1989 | Landt | ............................. | 411/188 |
| 4,812,095 A * | 3/1989 | Piacenti et al. | ............... | 411/188 |
| 5,141,376 A * | 8/1992 | Williams et al. | ........... | 411/387.4 |
| 5,203,657 A * | 4/1993 | Nagoshi et al. | ............... | 411/399 |
| 5,433,569 A | 7/1995 | Fall et al. | | |
| 5,683,217 A * | 11/1997 | Walther et al. | ................ | 411/399 |
| 5,772,376 A * | 6/1998 | Konig | ............................ | 411/399 |
| 6,149,363 A * | 11/2000 | March | ........................ | 411/366.1 |
| 6,290,444 B1 * | 9/2001 | Dicke | ............................ | 411/399 |
| 6,361,259 B1 * | 3/2002 | Koeppel et al. | ............... | 411/399 |
| 6,394,725 B1 * | 5/2002 | Dicke | ............................ | 411/399 |
| 6,558,097 B2 * | 5/2003 | Mallet et al. | .................. | 411/399 |
| 6,616,391 B1 | 9/2003 | Druschel | | |
| 6,923,611 B2 * | 8/2005 | Kenny | .......................... | 411/411 |
| 7,101,133 B2 * | 9/2006 | Dicke | ........................ | 411/387.4 |
| 7,334,976 B2 * | 2/2008 | Dicke | ............................ | 411/399 |

FOREIGN PATENT DOCUMENTS

CA 2198832 4/2002
JP 59-24516 2/1984

\* cited by examiner

*Primary Examiner* — Roberta Delisle
(74) *Attorney, Agent, or Firm* — Nixon & Vanderhye P.C.

(57) ABSTRACT

A self-countersinking screw (10) is capable of full penetration into wood, plastic veneered wood, and cementaceous products. An alternating sequence of peripheral cutters (A, B) extend from the periphery of the underside of the screw head (11), acting in conjunction with countersink cutting edges (24) and debris receiving recesses (20). Cutter (A) has an arcuate notch (30) in the cutting face (28), cutter (B) has a rectangular notch (31) in the trailing edge. Full countersinking without tearing, cracking or dimpling of the surface is achieved.

11 Claims, 5 Drawing Sheets

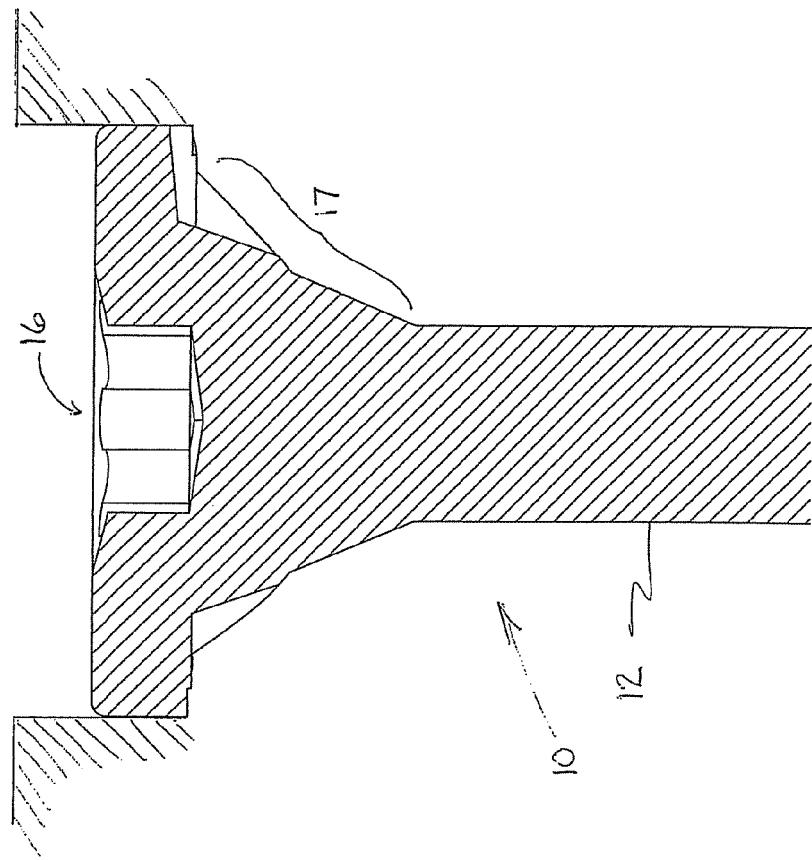
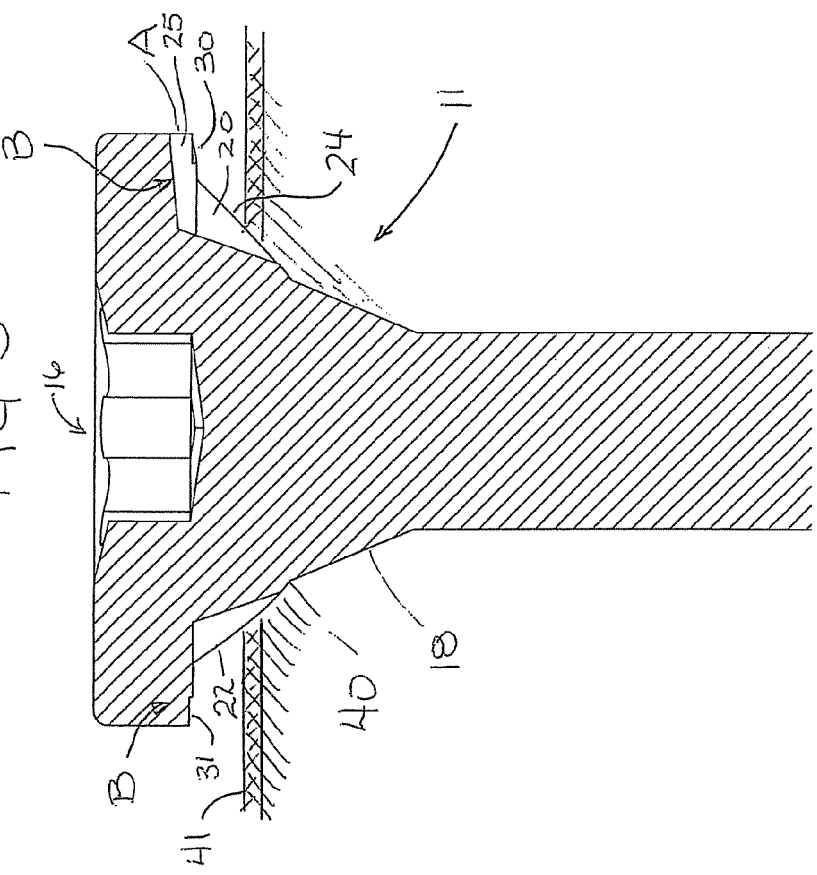

SELF-COUNTER-SINKING SCREW WITH CIRCUMFERENTIAL CUTTERS

BACKGROUND OF THE INVENTION

This invention relates to a self-countersinking screw, particularly adapted for use with prepared lumber or composite wood having a veneer coating, such as Melamine™, Arborite™ and Formica™. It has further application to cementaceous products such as cement board. The screw uses shaped cutters arranged circumferentially around the peripheral underside of the head of the screw, which enable the screw head to penetrate into the surface of the substrate, at least flush with the surface.

Screws with serrations or notches on the underside of the screw head are known. For example, U.S. Pat. No. 5,433,569 (Fall et al) discloses a screw for use in thin metal plating wherein an annular flange has a series of serrated ridges extending radially from the screw axis across the underside of the flange. These serrations are intended to resist further turning of the screw once the flange has contacted the metal surface.

U.S. Pat. No. 6,616,391 (Druschel) discloses a screw for use in plastic composite lumber wherein the screw head has an annular lip on the underside, the lip including a series of incised notches (teeth) to aid in penetrating the surface of plastic lumber and to resist backing out of the screw.

Canadian Patent 2,198,832 (Walther) discloses a self-countersinking screw with radiating cutter edges and pocket recesses on the underside of the screw head.

A problem with many existing screws arises where screws are driven directly into a plastic veneered substrate without utilizing a pilot hole. The screw heads tend to crush through the plastic veneer, causing cracking and raising a dimple in the veneered surface. In thinner plastic film veneers, torsion from the underside of the screw head tends to tear the film. When prior screws are driven into cement board, it has been extremely difficult to bury the head of the screw below the surface of the cement board, unless a pilot countersunk hole is utilized. Such additional step increases costs and time of installation.

SUMMARY OF THE INVENTION

It is an object of the present invention to provide an improved self-countersinking screw adapted to penetrate a hard, brittle or thin plasticised surfaces veneered onto lumber or composite woods, such as is commonly used on furniture and shelving surfaces, without causing cracking, "mushrooming" or tearing of the surface as occurs with conventional screws if pilot holes are not pre-drilled.

It is a further object to provide a screw for use in fine woodwork or cabinetry where the head forms a orifice adapted to receive a plug.

Still further, it is an object of the present invention to provide a screw capable of penetrating and countersinking into cementaceous product such as cement board and lightweight concrete panels and blocks.

In general terms, the present invention provides a self-counter-sinking screw comprising a screw head with driver engaging means, a threaded shank portion extending from the head; the underside of the head having a frustoconical shoulder tapering to the shank, the frustoconical portion having a plurality of generally triangular recesses defining a plurality of radial cutting edges, the underside of the head further having a plurality of circumferential generally scalene triangular cutters extending in a circumferential ring from the peripheral underside of the head.

The frustoconical shoulder, with inset triangular recesses and cutting edges, acts as a countersink device, with the recesses adapted to form pockets which contain scarified debris from the countersinking action. The peripheral ring of cutters are arranged circumferentially outwardly from the countersink pockets. Each triangular cutter can have specialized cutting facets at the peak, the facets creating multiple cutting edges adapted to cut into a hardened plastic surface such as Melamine. The correlation of the pockets adjacent the cutters allows the debris from cutting to be ejected or trapped in the pockets, and facilitates the full, flush penetration of the screw head into the plastic veneered surface without causing dimpling, buckling or mushrooming of the surface. In effect, the multiple cutters act to plane or shave a precision circular, smooth sided, groove in the plastic surface as the screw is countersunk into the underlying substrate.

The screw is more stable as it cuts and countersinks, due in part to the plurality of cutting surfaces balancing out lateral pressures. This permits the cutters of the screw to form a clean, precision, circular penetration of the substrate surface, without irregular tears or notches.

Prior to the development of the present screw, in order to allow screw heads to penetrate below the surface of a laminated workpiece, it was necessary to drill a pilot hole having a diameter compatible with the size of the screw head. Failure to drill a pilot or countersink hole resulted in the screw head applying pressure against the laminated material during penetration. Such pressure caused buckling or mushrooming of laminate material, and in particular would cause significant radial cracks in a hard laminate surface. The present invention virtually eliminates this problem.

BRIEF DESCRIPTION OF THE DRAWINGS

The invention will be described by way of a preferred embodiment, with reference to the accompanying simplified, diagrammatic, not-to-scale drawings, wherein:

FIG. 5 is a view, similar to FIG. 1, but showing the frustoconical shoulder of the screw partially embedded in a workpiece; and FIG. 6 is a view, similar to FIG. 1, but showing the screw fully embedded in a workpiece.

DETAILED DESCRIPTION OF A PREFERRED EMBODIMENT

Figure 1:
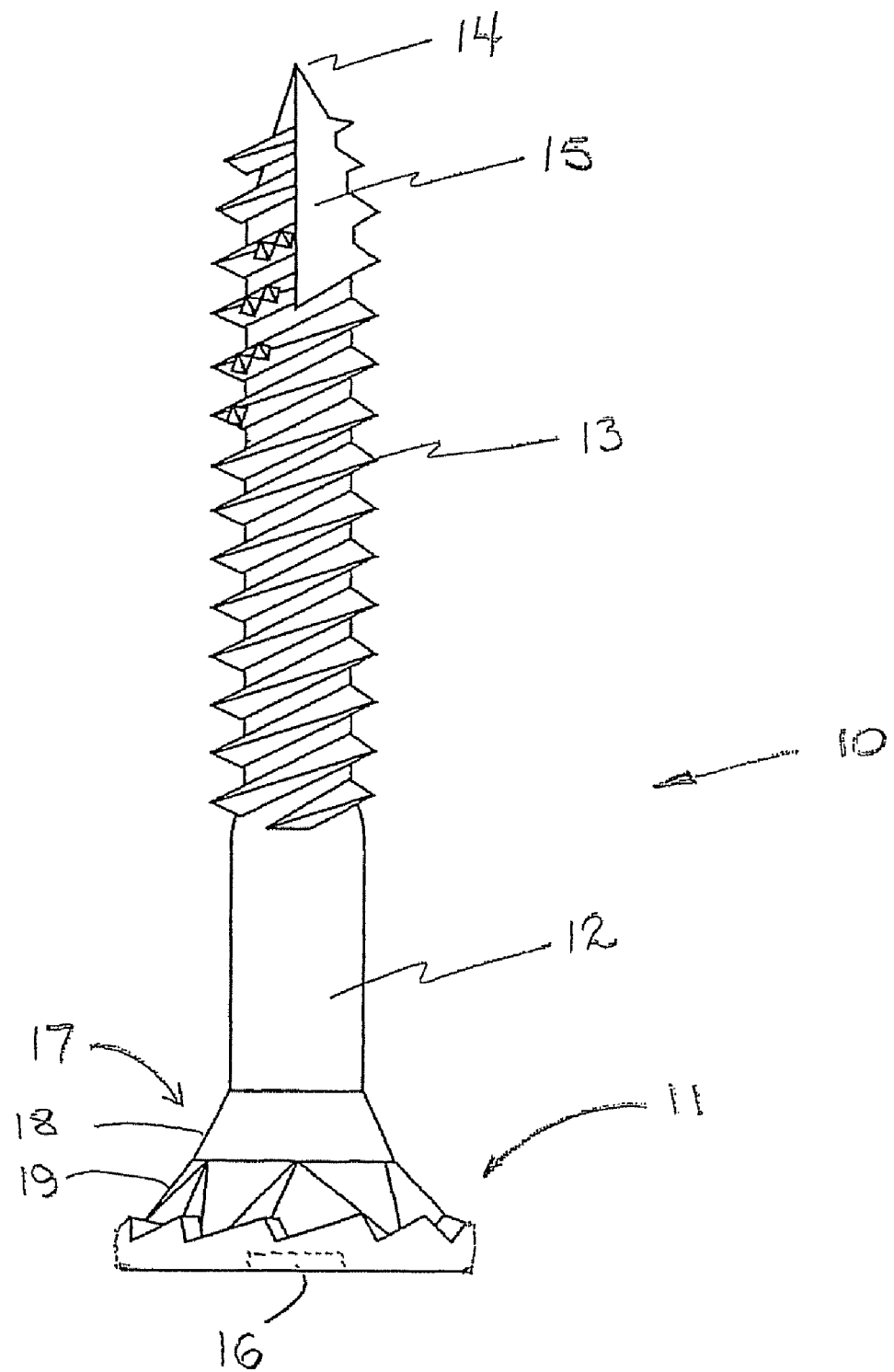
FIG. 1 is a side view of the screw incorporating the features of the present invention.
Figure 2:
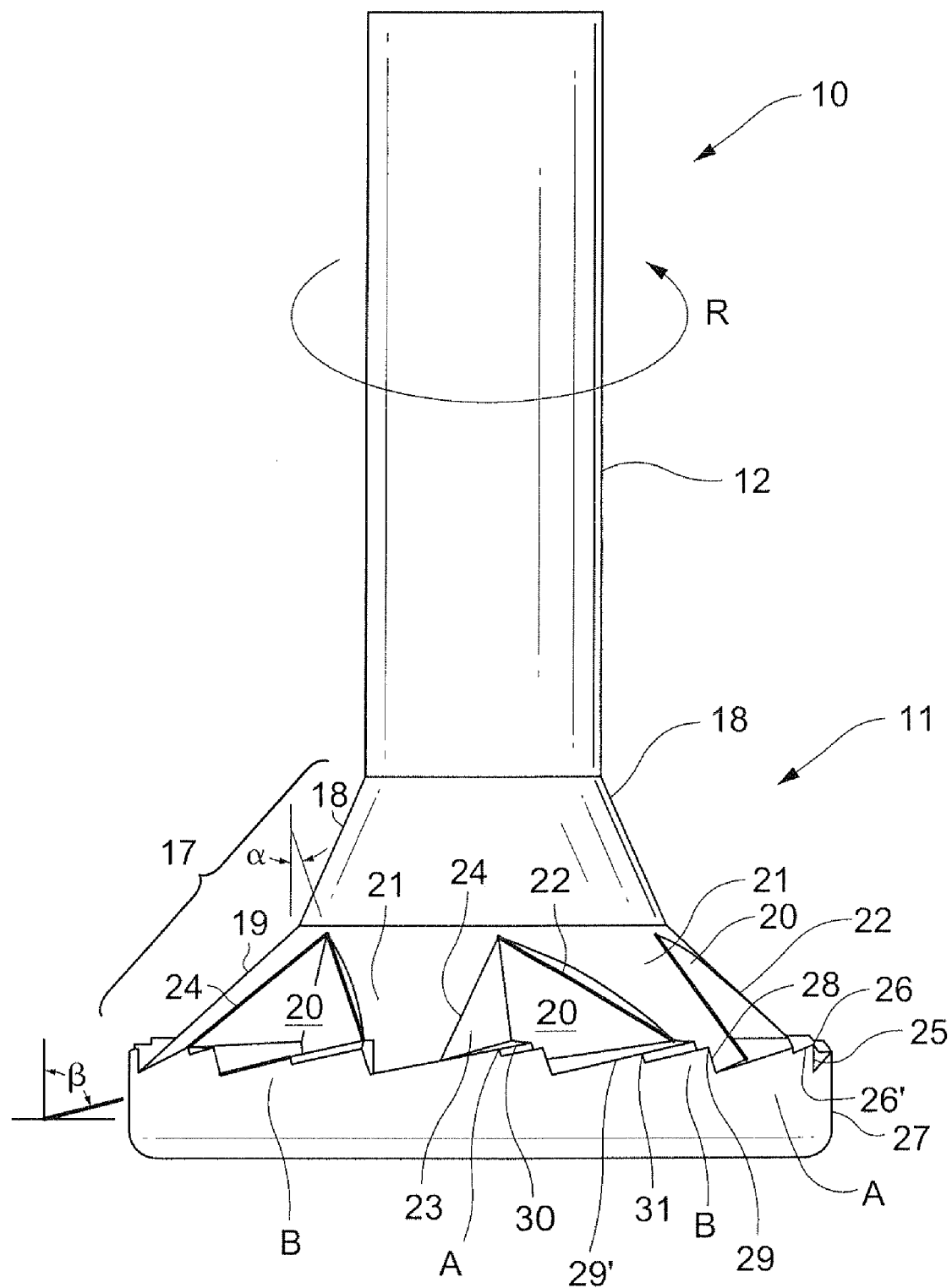
FIG. 2 is an enlarged detailed drawing of the head portion of the screw shown in FIG. 1.
Figure 3:
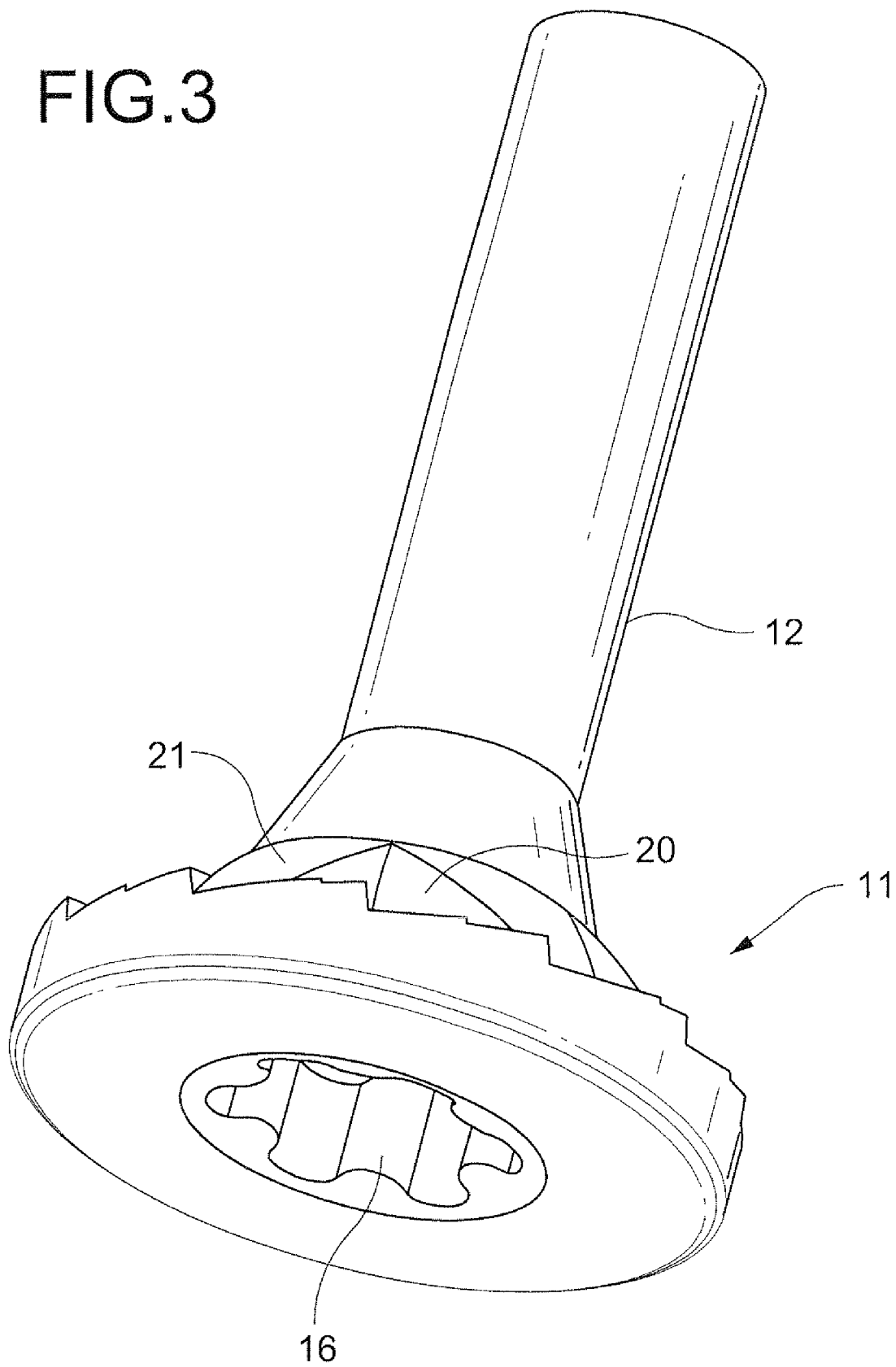
FIG. 3 is a perspective view of the head portion of FIG. 2.
Figure 4:
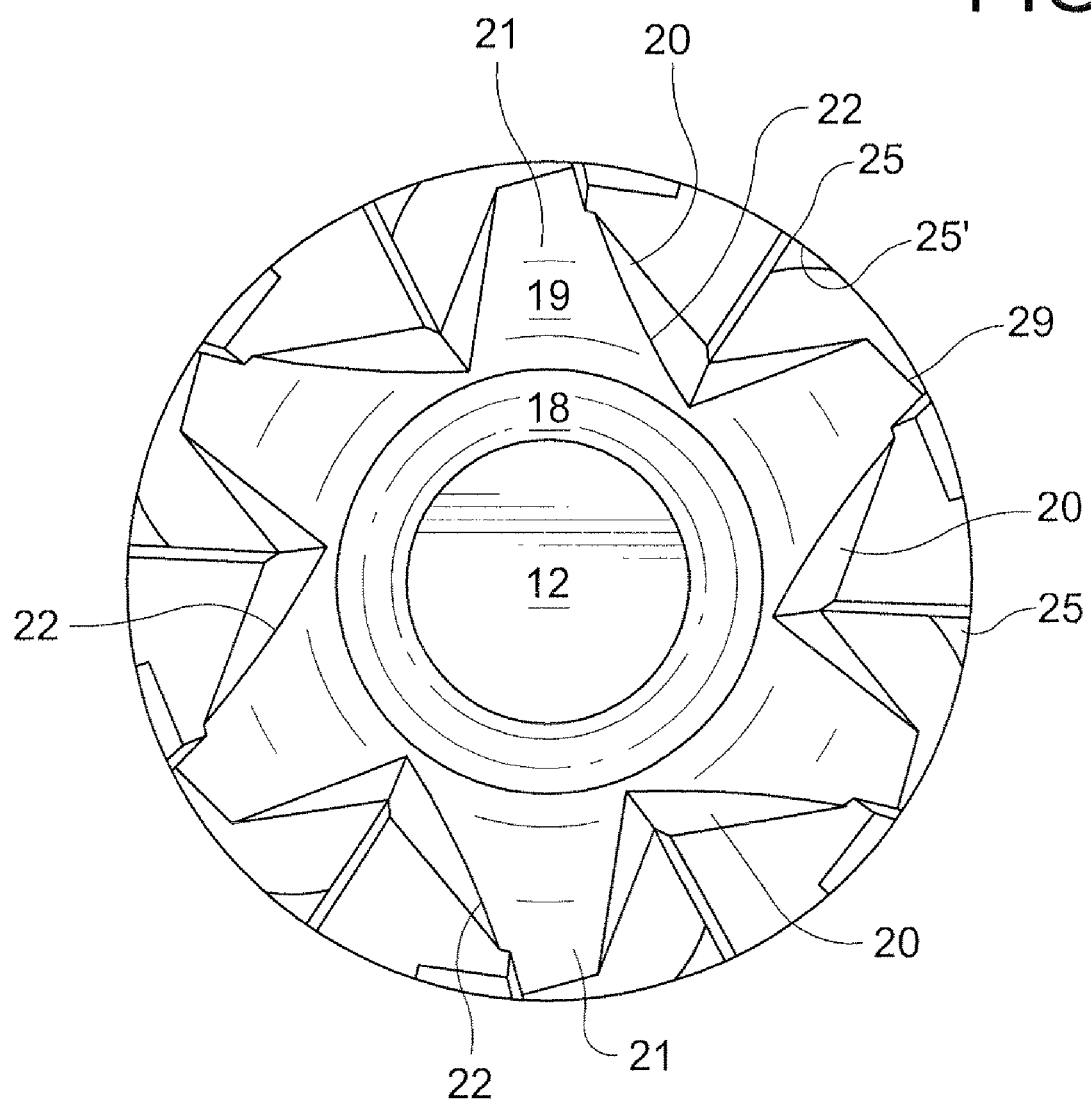
FIG. 4 is a plan view of the head portion of the screw cross-sectioned through the shank.

With reference to the drawings, and in particular to FIGS. 1 and 2 thereof, the self-countersinking screw 10 comprises a head 11 and a shank 12 with threads 13 ending in a tip 14. Penetration of the screw into the workpiece may be aided by a gimlet or Speedtip™ notch 15. The head 11 has a generally conical shape, with the top of the screw head having a screw driver engaging means 16 adapted to receive the tip of a screwdriver (not shown) or other driving means. It should be noted that the screwdriver engaging means may be any suitable shape including slot, Allen/hex, Phillips, Robertson, or Torx, (as illustrated in FIG. 3).

The underside of the head 11 connects to the shank 12 by a generally frustoconical shoulder 17. In the embodiment illustrated in FIGS. 1 and 2, the frustoconical shoulder 17 comprises two frustoconical portions having different tapers, namely a first shoulder portion 18 and a second shoulder portion 19. However, a single frustoconical shoulder may be employed. As illustrated, the first shoulder portion 18 is frustoconical, and subtends a minor angle from the axis of the screw, generally less than 30°. The second shoulder portion is also generally frustoconical and subtends a larger angle from the axis of the screw, up to approximately 45°. The combination of first and second shoulder portions allows the shoulder to ease into the substrate surface in graduated steps.

The second shoulder portion 19 contains a plurality of generally triangular recesses 20 (separated by intermediate frustoconical surfaces or lands 21). The recesses are termed "generally triangular" to indicate that the contour is not a true triangle, and the depth of the recesses gradually increases in the counter-rotational direction.

With a typical right hand drive screw, having a direction of rotation R each land 21 joins recess 20 at a descending edge 22 on the frustoconical surface of second shoulder portion 19. Recess 20 descends from descending edge 22 below the surface of second shoulder 19, reaching the adjacent (in a counter rotational direction) land 21 at a generally flat wall 23 extending outwardly parallel to the axis of the screw. The wall 23 defines a countersink edge 24 at the surface of the adjacent land 21. Countersink edge 24 defines a cutting edge to scarify material from the surface of the workpiece as the screw is inserted into the workpiece. Recesses 20 act in conjunction with countersink edge 24 to collect debris scarified from the surface and ejected from the screw bore being formed in the workpiece.

In addition to the foregoing countersinking features of the screw, the screw of the present invention embodies a novel set of cutters arranged on the peripheral underside of the screw head 10. The cutters generally constitute a series of scalene triangular elements having a steep leading face in the direction of rotation, the face having an angle α of about 10° to 20°, preferably about 15° from a radial plane passing through the axis of the screw. The trailing or receding surface of the cutters has an angle β approximately 70° to 80°, preferably about 75° from the axis of the screw (15° from a plane transverse to the axis of the screw). The cutter ring comprises a repeating sequence of two different cutter elements. A first cutter A has a cutting face 25 with a cutting edge 26 at the peak which extends from the peripheral rim 27 of the screw, radially inwardly, and intercepts recess 20 at its juncture with countersink face 23.

The second cutter B in the sequence has a cutting face 28 with a cutting edge 29 at the peak, which also extends radially from the peripheral rim 27, meeting land 21 at countersink edge 24 of recess 20.

The alternating sequence of first and second cutters arranged on the peripheral underside of the screw head 11 cut or plane into the surface of the workpiece as the screw is advanced. Cutting edges 26 and 29 excise material from the surface of the workpiece, permitting the screw head to penetrate into the workpiece. The radial array of cutting edges 26 and 29, in conjunction with the frustoconical shoulder portion 19 and countersink edge 24 combine to eject debris resulting from the screw penetration and countersinking. Any remaining debris is captured within the recesses 20. This combination of countersink and cutters is particularly advantageous when the screw is utilized on workpieces such as composite wood materials which have a hardened plasticized veneer surface, such as Melamine™, Arborite™ and Formica™ and similar surfaces as frequently used in furniture, shelving, and counters, amongst other products.

In a preferred embodiment of the present invention, cutters A and B have additional cutting facets. The first cutter A, which has a cutting edge 26 extending radially into the recess 20, also has an arcuate notch 30 on the trailing surface of the cutter. This results in a bifurcated cutter crest, the first crest being defined by edge 26 and a second edge 26' defined by the face of the arcuate notch. The bifurcation of the cutting crest produces additional cutting edges and aids in the scarification and removal of debris during countersinking of the screw through a hardened surface. In addition, the arcuate cutting edge 26' aids in ejection of debris out of the bore hole of the screw.

In the second cutter B, which has a cutting edge 29 adjacent descending edge 22 of recess 20, a notch 31 is formed on the circumferential outer edge of the trailing surface, behind cutting edge 29. The notch 31 may be generally rectangular, resulting in a secondary cutting edge 29'. It is believed that the plurality of notches increase the number of cutting edges acting against a laminated surface of a workpiece, and greatly increase the scarifying and cutting capability of the screw to permit a clean, excised edge in the laminate as the self-countersinking screw penetrates into the workpiece.

The precise arcuate radius or size of the notches in respect of cutters A and B is not crucial, but the radius of the arc not exceed the width of the cutters. In addition, the inner face of notch 31 may be inclined inwardly to provide additional impetus for ejection of debris. It is preferable that all cutting edges are generally in the same plane.

In operation, (FIGS. 5 and 6), the screw 10 is threaded into a workpiece 40 which is typically made of composite wood material laminated with a hard plasticised surface such as Melamine™, Arborite™ or the like. However the workpiece could be cement board, cementaceous block, or even furniture grade wood. Upon penetration of the screw into the workpiece, the frustoconical underside of the head contacts the surface of the workpiece. The first frustoconical portion eases into the workpiece at which point the second frustoconical shoulder with recesses 20 and countersink edges 24 commences the scarification of the laminated surface of the workpiece, removing material therefrom and allowing the screw to penetrate into the work piece. The radial countersinking edges 24 project debris from the hole or allow it to collect in the recesses 20.

At a point when the screw has advanced so as to countersink the frustoconical shoulder, the cutters on the underside of the screw head can contact the surface 41 of a laminated workpiece 40. Upon further rotation, the cutters scarify the hard plasticized surface of the laminate, cutting a precise circular edge to the bore while ejecting excess material from the borehole. When the screw has completely penetrated the surface of the workpiece, and is flush with the workpiece surface, rotation is discontinued. The operation results in a smooth, flat surface on the workpiece without any dimples or radiating cracks, which otherwise result from utilization of a conventional screw without prior pilot countersinking.

The screw of the present invention is completely self-tapping—in other words it can penetrate into a Melamine wood—backed structure without the need of a pilot hole, and will completely countersink itself, below the surface if desired. The countersink feature of the inventive screw is equally effective in thick or thin veneer, even film thickness veneers. Further, the screw can be countersunk into a wood surfaced structure sufficiently that a precise circular orifice is formed, allowing the subsequent insertion of a finishing wood plug. The screw is useful in any wood or wood composite material that requires or benefits from the countersinking capability. It has a particular benefit in fine cabinetry and woodwork as it can form a deep (3-6 mm) countersunk orifice, into which a finishing wood plug or dowel can be inserted without further preparation. This significantly expedites cabinetry work.

Still further, the screw of this invention is particularly useful with a grade of cementaceous products such as cement board or lightweight, non-combustible, insulating cement panels or blocks known as Autoclaved Aerated Concrete (AAC)™ distributed by Texas Contec, Inc. The inventive screw is singularly capable of achieving full penetration into the cementaceous material, and can be fully countersunk below the surface of the material. This is particularly advantageous in applications where a protruding screw head would interfere with a surface application, such as ceramic tiles. Consequently, the present countersinking screw has a multitude of beneficial applications ranging from clean countersunk penetration of hard laminates, cementaceous products, or into wood for insertion of finishing plugs.

Those skilled in the art will readily appreciate that many modifications may be made to the preferred embodiment described without departing from the scope of the present invention. In particular, the cutting edge of the countersink portion may be purely radial or inclined. Similarly, the cutting edges of the ring of cutters may be radial or inclined from the axis of the screw. As well, the exact shape and depth of the arcuate and rectangular notches in the respective cutters may be varied so long as the secondary cutting edges remain effective. It is understood that all such modifications fairly fall within the scope of this invention, and are intended to be covered in the appended claims.

The invention claimed is:

1. A self-countersinking screw comprising:
   a threaded shank having a longitudinal axis,
   a screw head including driver engageable means on a top surface; and an underside having a frustoconical shoulder tapering to the threaded shank;
   the frustoconical shoulder having a plurality of generally triangular recesses therein, whereby the recesses have a generally vertical wall substantially in a plane parallel to the axis of the screw,
   the underside of the head having a plurality of pairs of cutters arranged peripherally around the circumference and abutting each triangular recess;
   the cutters comprising a succession of two cutter shapes, a first cutter having a first generally scalene triangular shape adjoining the vertical wall of the triangular recess and a second cutter having a second generally scalene triangular shape different from the first generally scalene triangular shape and being incorporated into the triangular recess.

2. The screw of claim 1, wherein both cutters have a steep leading cutting face in the direction of rotation of the screw, and a trailing surface intersecting the leading face at a crest which provides a cutting edge;
   the triangular first cutter being bifurcated at its crest to provide two cutting edges; and
   the triangular second cutter having a notch extending laterally inwardly from the circumference of the trailing surface of the second cutter.

3. The screw of claim 2, wherein the crest of the first cutter is bifurcated by an arcuate notch extending laterally inwardly.

4. The screw of claim 3, wherein the arc of the notch has a radius no greater than the width of cutters.

5. The screw of claim 2, wherein the notch of the second cutter is generally rectangular, with the length extending parallel to the periphery of the screw head.

6. The screw of claim 5, wherein the generally rectangular notch provides a secondary cutting face at its trailing end.

7. The screw of claim 6, wherein the generally rectangular notch has an interface inclined inwardly towards the axis of the screw.

8. The screw of claim 1, wherein the frustoconical shoulder has a first frustoconical portion adjacent the shank and a second frustoconical portion between the first frustoconical portion and the underside of the head.

9. The screw of claim 1, wherein the first frustoconical portion has a smaller included angle than the included angle of the second frustoconical portion.

10. The screw of claim 1, wherein the triangular recesses are in the second frustoconical portion.

11. A self-countersinking screw comprising:
    a threaded shank having a longitudinal axis,
    a screw head including driver engageable means on a top surface; and an underside having a frustoconical shoulder tapering to the threaded shank;
    the frustoconical shoulder having a plurality of generally triangular recesses therein, whereby the recesses have a generally vertical wall substantially in a plane parallel to the axis of the screw, the periphery of the underside of the head having a plurality of cutters arranged circumferentially and abutting the frustoconical shoulder and recesses;
    the cutters comprising a succession of two cutter shapes, a first cutter having a first generally scalene triangular shape adjoining the vertical wall of the triangular recess and a second cutter having a second generally scalene triangular shape being incorporated into the triangular recess,
    wherein both cutters have a steep leading cutting face in the direction of rotation of the screw, and a trailing surface intersecting the leading face at a crest which provides a cutting edge;
    the triangular first cutter being bifurcated at its crest to provide two cutting edges; and
    the triangular second cutter having a notch extending laterally inwardly from the circumference of the trailing surface of the second cutter.

* * * * *